Jan. 10, 1928.
A. H. C. HORNBOSTEL
GOVERNOR
Filed Feb. 28, 1924
1,655,647
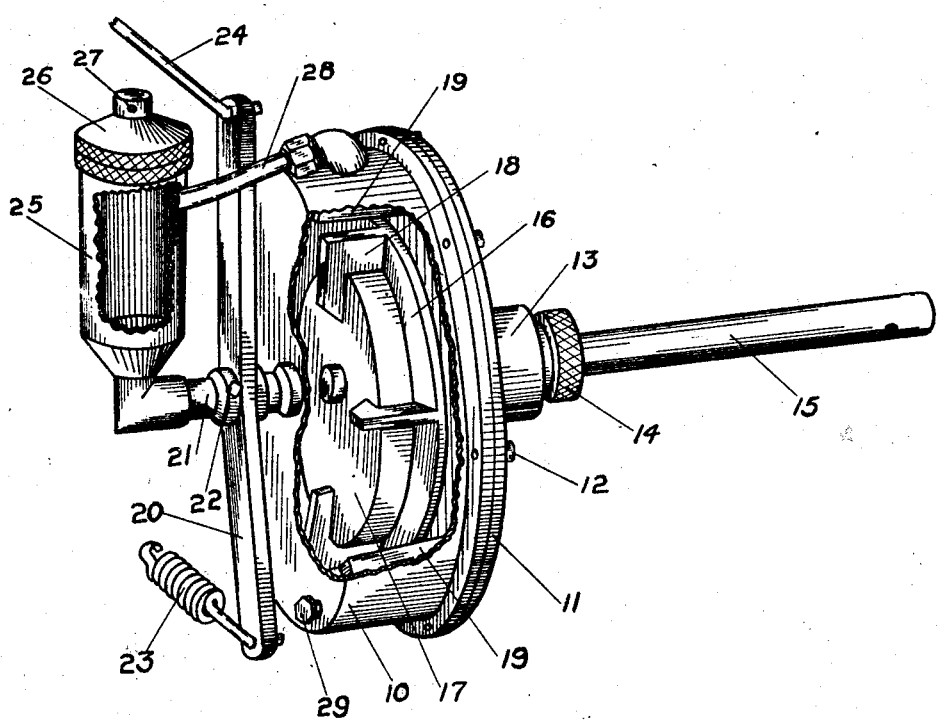
A.H.C. HORNBOSTEL. INVENTOR.
BY
*Emil F Lange* ATTORNEY.

Patented Jan. 10, 1928.

1,655,647

UNITED STATES PATENT OFFICE.

ADOLPH H. C. HORNBOSTEL, OF DESHLER, NEBRASKA, ASSIGNOR OF ONE-HALF TO JOHN BOEN RICKETTS, OF LINCOLN, NEBRASKA.

GOVERNOR.

Application filed February 28, 1924. Serial No. 695,743.

My invention relates to speed responsive devices of the type having a casing which is rockably mounted and yieldably held to resist the rocking movement, the casing having a chamber for holding a fluid, with rotating paddles for imparting the rocking impulses, the rotating paddles being positioned within the chamber and being actuated by a rotating shaft. Speed responsive devices of this type are used for controlling the speed of engines of the various types, for indicating shaft speeds in various types of speed meters, and for other similar purposes.

Lubricating oil is peculiarly adapted for use in governors of this type and is generally preferred over most of the other fluids which are available for use in the chamber. In my experience with speed responsive devices of this type however, I have found a serious drawback in their construction which I believe has prevented the more general adoption of such speed responsive devices. The oil or other liquid is churned by the paddles and thus becomes aerated, the suspended particles of air become heated and thus are caused to expand, the final result being that the pressures inside the casing cause the liquid to ooze out through the bearing and through the joints. The accuracy of the speed responsive device is destroyed by the diminution of the quantity of liquid in the chamber, and when as in most cases the liquid is oil, the oil gathers on the outside of the casing and the connections and accumulates dust and grit. My invention has for its main object the provision of means for preventing the loss of oil from the chamber and for maintaining the pressure inside the chamber in equilibrium with the atmospheric pressure.

Having in view this object and others which will be brought out in the following description, I will now refer to my drawing, in which the figure is a view in perspective of my speed responsive device, parts being broken away to disclose interior constructions.

The casing of my speed responsive device consists of the two parts 10 and 11. The part 10 is cylindrical, the interior being the fluid chamber. At its open end the part 10 has an outwardly projecting flange which is provided with a plurality of screw threaded apertures, these apertures being preferably equidistantly spaced. The part 11 is in the form of a disc having the same diameter as the exterior of the flange on the part 10. The part 11 is adapted to serve as a closure for the open end of the part 10 and is provided with apertures which register with the apertures in the flange of the part 10. The two parts of the casing are securely held together by means of screws 12 or other suitable fastening devices passing through the registering apertures in the parts 10 and 11.

Centrally positioned on the part 11 and projecting outwardly therefrom is a boss 13 which is interiorly screw threaded to receive the bearing member 14. The shaft 15 has its bearing in the bearing member 14, whence it passes through the disc 11 and into the chamber. Secured to the shaft 15 at its inner extremity are two discs 16 and 17, the disc 16 having a greater diameter and less width than the disc 17. The paddles 18 are substantially L-shaped and are secured to both discs 16 and 17 with a portion projecting inwardly from the inner face of the disc 17. In a radial direction the paddles 18 extend to the periphery of the disc 16 but they terminate considerably short of the center of rotation of the discs. In practice I prefer to cast the discs 16 and 17 and the paddles 18 integrally.

The shaft 15 may be actuated from any rotatable element of the machine or tool to which the speed responsive device may be applied. The rotation of the shaft causes the rotation of the paddles 18 in the oil or other fluid, the liquid being thus caused to whirl and to assume a cylindrical form due to the centrifugal force accompanying its whirling movement. The fluid thus tends to bank up against the inner curved wall of the chamber, the central portion of the chamber being comparatively free of fluid during the rotation of the paddles. The paddles terminate considerably short of the center of rotation and their inner ends are bevelled, so that the action of the paddles does not extend much beyond the zone of the fluid. The part 10 of the casing is provided with a plurality of baffles 19 which project inwardly into the chamber and which obstruct the whirling movement of the fluid in the chamber. It will readily be seen that this obstruction creates a pressure which has a tendency to move the casing in the direction of movement of the paddles. The magnitude of this pressure would of course vary with the speed of the shaft 15.

In order to utilize the pressure for any of the various uses of my speed responsive device, I provide a two-arm lever 20 and so mount it that its rocking movements vary with those of the casing. It is obvious that this can be done in any one of several ways, of which I have shown one in my drawing. Projecting outwardly from the part 10 of the casing and rigidly secured thereto is a tubular arm 21, this arm being preferably positioned at the center of the rocking movement of the casing. The lever 20 is secured by means of a set screw 22 or other suitable means to the arm 21, so that the rocking movement of the casing is imparted in equal degree to the lever 20. In order to yieldably resist the rocking tendency of the casing and of the lever, I provide a spring 23 of suitable tension, which I secure to the lever at one of its ends. By securing the free end of the spring to a fixed part of the engine or other support, the spring will resist the rocking movements but will permit the rocking movements when the pressures inside the casing exceed the tension of the spring. The opposite end of the lever 20 has secured thereto a rod 24 or other suitable element for transmitting the movement of the lever to a speed controlling element of the engine or to an indicator or to any other suitable element depending on the use to which my speed responsive device is put. In order to vary the adjustment of the parts it is only necessary to release the set screw, to shift the lever 20 on the arm 21, and to then lock the lever in position by means of the set screw.

In order to prevent the oozing out of the liquid I provide means for preventing the pressure inside the casing from exceeding the atmospheric pressure outside the casing. The arm 21 is tubular and communicates with the chamber in the casing. To this tubular arm I secure a cup 25 having a lid 26 and an air vent 27. A second hollow tube 28 connects the upper portion of the chamber in the casing with the cup 25. A screw threaded plug 29 is inserted in an aperture at or near the bottom of the casing, whereby the oil may be drained out of the casing when desired.

In the operation of my speed responsive device the rapidly rotating paddles 18 will set up a centrifugal whirl in the fluid contained in the chamber of the casing, the fluid in most cases being oil of some kind. In my device the radial pressure simply forces the oil out through the tube 28 into the cup 25 and thence back into the chamber through the tube 21, the oil releasing most of its suspended air in its passage. Thus at any given speed of the shaft 15 the quantity of oil in the chamber is constant, and the quantity of oil in the chamber remains substantially constant with wide variations in the speed of the shaft 15. Since the cup 25 is vented at 27, the inside pressure will always be equal to the atmospheric pressure so that no oil will be forced out through the joints or through the bearing. In filling the device with oil it is only necessary to remove the cap 26 and to introduce the oil through the cup 25. When it is desired to drain the oil from the chamber the plug 29 is removed, whereupon the oil will flow out through the aperture.

The character of the fluid used in the chamber must depend to some extent on the use to which the speed responsive device is put. For ordinary purposes, oil is probably the best fluid because of its viscosity and because it is readily available in connection with the machine on which the device is used. In some cases it might be desirable to depend on the air within the chamber or to introduce some other gas. In the prior devices of this kind it would be impossible to depend on any fluid except a liquid of high viscosity, and even with those the results are exceedingly unsatisfactory. My device however provides for means which equalize the external and internal pressures, at the same time providing for the flow of the fluid through an exterior channel. Because of this it is possible for me to use fluids other than those heretofore used and to obtain very much more satisfactory results with the oils which have been heretofore used.

My present models of the herein described speed responsive device have been specially designed for use on the Fordson tractor for the purpose of governing the speed of the tractor engine. Such governors have been installed on a number of Fordson tractors which had previously been tried out with governors of similar type but without my oil cup 25. The prior governors thus tried out proved to be uncertain and unreliable in operation, they resulted in considerable waste of the oil, and they were usually coated with a thick coat of oil mixed with the dust of the field. My governor on the other hand responds uniformly at all speeds of the tractor engine and its exterior surface is always dry and free from dust.

In is evident that various changes, variations, and modifications might be resorted to without departing from the spirit and scope of my invention and hence I do not wish to limit myself to the exact disclosure of my speed responsive device as set forth in my description and drawing.

Having thus described my invention in terms which will be readily understood by others skilled in the art to which it pertains, what I believe to be new and desire to secure by Letters Patent of the United States is:

A speed responsive device comprising a cylindrical casing, means for yieldingly holding the casing against turning, a shaft journaled axially in one side of the casing, radially disposed blades carried on the shaft within the casing and terminating at their inner ends in spaced relation to the shaft, a plurality of radial baffles arranged within the casing outwardly of the baffles on the shaft, a tubular member journaled through the opposite side of the casing in axial alinement with the shaft, a liquid reservoir connected to the tubular member for supplying liquid centrally in the casing, and a return connection between the top of the casing and the top of the reservoir, whereby centrifugal action of the blades on the shaft is adapted to create radial currents in the casing for impact between the baffles on the shaft and the baffles on the casing.

In testimony whereof I affix my signature.

ADOLPH H. C. HORNBOSTEL.